United States Patent
Lim

(10) Patent No.: US 7,702,368 B2
(45) Date of Patent: Apr. 20, 2010

(54) APPARATUS AND METHOD FOR CONTROLLING SPEAKER VOLUME OF PUSH-TO-TALK (PTT) PHONE

(75) Inventor: Guk-Chan Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/117,605

(22) Filed: Apr. 29, 2005

(65) Prior Publication Data

US 2005/0250553 A1 Nov. 10, 2005

(30) Foreign Application Priority Data

Apr. 30, 2004 (KR) ...................... 10-2004-0030755

(51) Int. Cl.
*H04M 1/00* (2006.01)
*H03G 3/00* (2006.01)
*H04B 1/38* (2006.01)
*H04B 15/00* (2006.01)

(52) U.S. Cl. .................. 455/569.1; 381/107; 455/90.2; 455/518

(58) Field of Classification Search .............. 455/569.1, 455/415, 567, 566, 519, 575.1
See application file for complete search history.

(56) References Cited

U.S. PATENT DOCUMENTS

| 5,448,620 | A | * | 9/1995 | Gershkovich et al. | .... 455/552.1 |
|---|---|---|---|---|---|
| 5,884,156 | A | * | 3/1999 | Gordon | ...................... 455/321 |
| 6,349,225 | B1 | * | 2/2002 | Lands et al. | ............. 455/575.3 |
| 6,547,620 | B1 | * | 4/2003 | Hatamura et al. | ........... 455/415 |
| 2002/0044199 | A1 | * | 4/2002 | Barzebar et al. | ......... 348/14.01 |
| 2003/0034439 | A1 | * | 2/2003 | Reime et al. | ................ 250/221 |
| 2005/0239487 | A1 | * | 10/2005 | Glass et al. | ................. 455/519 |

FOREIGN PATENT DOCUMENTS

| CN | 1291852 A | 4/2001 |
|---|---|---|
| EP | 1 071 263 A1 | 1/2001 |
| JP | 2001-189794 A | 7/2001 |
| JP | 2005-109257 | 4/2005 |

* cited by examiner

*Primary Examiner*—Melody Mehrpour
(74) *Attorney, Agent, or Firm*—Birch, Stewart, Kolasch & Birch, LLP

(57) ABSTRACT

An apparatus and method for controlling a speaker's volume of a push-to-talk (PTT) phone avoid an undesirably loud volume sound from the speaker that may be caused due to inadvertence of the user during a PTT call mode. While in a PTT call mode, physical contact between the user and a contact sensing unit, provided at a PTT button or at an earpiece, is sensed. The speaker volume is automatically adjusted according to how the user is holding the phone, as determined by the contact sensing unit. Thus, the emanation of undesirably loud sounds from a loud speaker of the phone (e.g. as occurs during a PTT session) can be prevented when it is determined that the user has the earpiece adjacent to their ear (e.g. as occurs during a normal mobile telephone conversation).

14 Claims, 4 Drawing Sheets

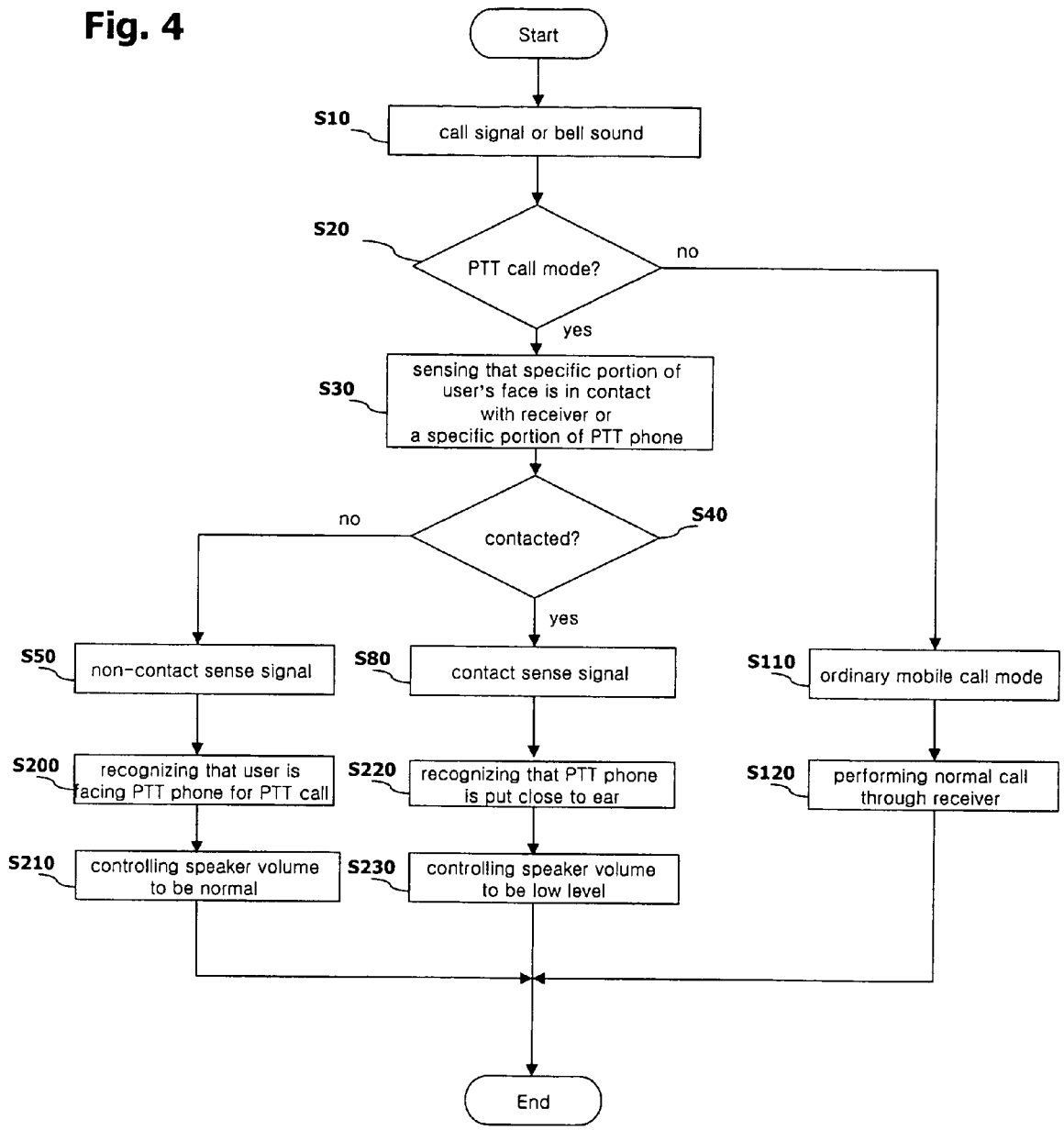

APPARATUS AND METHOD FOR CONTROLLING SPEAKER VOLUME OF PUSH-TO-TALK (PTT) PHONE

This application claims priority on Korean application serial No. 2004-0030755, filed Apr. 30, 2004, the entire contents of which are hereby incorporated by reference.

BACKGROUND OF THE INVENTION

1. Field of the Invention

The present invention relates to a push-to-talk (PTT) phone and, more particularly, to an apparatus and method for controlling a speaker volume of a PTT phone.

2. Description of the Background Art

Upon subscription with a mobile communication service, a mobile communication terminal (referred to hereinafter as a "phone" or "mobile phone") can make telephone calls to outside parties. This two-way connection is known as an ordinary mobile phone mode for the phone.

Some phones also have a mobile radio function. The phone can function as a walkie-talkie radio with a transmit button being provided on the phone. This one-way connection will be called a push-to-talk (PTT) mode for the phone. In the PTT mode, the user holds the phone away from their face, speaks to the phone from a distance, and hears the other party speaking via a loud speaker, sometimes mounted on the back or sides of the phone. The PTT communication mode is very different from the mobile phone communication mode, where the user holds the phone to their face/ear and speaks directly into a microphone of the phone.

Some PTT type phones have a receiver (e.g. an earpiece in the form of a low volume speaker) which is held against the ear and a loud speaker (e.g. a high volume speaker) which is used during the PTT mode. Some PTT type phones have only one speaker which serves the dual function of the earpiece and the loud speaker. FIG. 1 is a view showing the exterior appearance of a PTT phone having a receiver (e.g. earpiece and a loud speaker), in accordance with the background art.

The PTT phone has two communication modes: an "ordinary mobile phone mode," which is used when the user wants to use the PTT phone as a typical mobile phone, and a "PTT call mode," which is used when the user wants to use the PTT phone as a mobile radio. In order to use the PTT phone as a mobile phone, the user can naturally grasp a lower portion of the PTT phone without letting a finger contact with a PTT button and communicate with the other party with the receiver portion of the PTT phone being held against the user's ear and a Mic portion held close to the user's mouth.

In order to use the PTT phone as a mobile radio, the user can press a finger on the PTT button of the PTT phone and communicate with the other party by using the speaker and Mic, with a certain interval maintained between the user's head and the PTT phone, in a facing relationship. It is noted that the way the user holds the PTT phone differs depending on the communication mode the user selects.

However, the background art has drawbacks. If the user forgets that they are using the phone in the PTT mode and holds the phone to their face/ear, as if using the phone in the mobile phone mode, the user will be surprised by the high volume of the voice of the other party from the loud speaker. This problem is partially alleviated when two speakers are provided in the phone and the loud speaker is locate away from the earpiece, such as on the backside of the phone or beside the keypad, as illustrated in FIG. 1. However, even with such a structural disposition of the speakers, the loud speak is still too close to the user's ear to completely avoid the surprise and annoyance of having the loud volume of the PTT mode communication so near to the user's ear.

SUMMARY OF THE INVENTION

Therefore, it is an object of the present invention to address one or more of the drawbacks of the background art.

It is an object of the present invention to provide an apparatus and method for controlling a speaker volume of a phone, so as to protect a user's hearing.

It is an object of the present invention to provide an apparatus and method to reduce the volume of a phone's speaker while the phone is communicating in a PTT mode, when the user is not holding the phone in a manner indicating that the PTT mode is desired by the user.

It is an object of the present invention to provide an apparatus and method to reduce the volume of a phone's speaker while the phone is communicating in a PTT mode, when the user is holding the phone to their face or ear.

To achieve these and other objects in whole or in part, there is provided a method for controlling a speaker volume of a phone comprising: sensing whether or not there is physical contact between a person and a contact sensing unit located on a portion of the phone; and based upon whether or not it is determined that physical contact exists, controlling a speaker volume of the phone.

To achieve these and other objects in whole or in part, there is also provided an apparatus for controlling a speaker volume of a phone comprising: a contact sensing unit for sensing contact with a person; and a volume controller connected to said contact sensing unit for controlling a speaker volume according to whether or not said contact sensing unit senses contact with a person.

To achieve these and other objects in whole or in part, there is further provided a phone comprising: an case; a contact sensing unit disposed on a portion of said case for sensing contact with a person; a speaker housed in said case; and a volume controller connecting said contact sensing unit to said speaker, said volume controller for controlling a speaker volume according to whether or not said contact sensing unit senses contact with a person.

Preferably, the contact sensing unit is formed in or adjacent to a PTT button of the phone, and/or the contact sensing unit is formed at or adjacent to a receiver/earpiece of the phone, which contacts with the ear/face of the user.

Preferably, the contact sensor unit senses an electrical signal of a small current generated when the hand, finger, ear or face of the user is in contact with a certain portion of the phone, and/or the contact is sensed by an optical sensor.

Preferably, the speaker volume is controlled to be one-step lower, (e.g. 10, 15, 20 or 25 decibels lower) than a currently set volume level of the phone in the PTT mode, based upon an output of the contact sensing unit.

Additional advantages, objects, and features of the invention will be set forth in the description which follows and will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements and wherein:

FIG. 4 is a flow chart of a method for controlling a speaker volume of a PTT phone having a contact sensing unit formed at a portion where the user's face or ear is to be in contact with the PTT phone in a mobile phone mode.

DETAILED DESCRIPTION OF THE PREFERRED EMBODIMENTS

The present invention is implemented in a push-to-talk (PTT) phone having a touch switch function, provided in or adjacent to a PTT button or at another specific portion of the phone.

The present invention is applied to an outer case of the phone where a user performs call communication with another party in a PTT mode. In the present invention, when a finger of the user is in contact with the PTT button of the PTT phone, having the touch switch function, it is recognized that the phone is in the "PTT call mode" and the speaker volume is adjusted to be normal. When there is no user's finger in contact with the PTT button, the speaker volume is adjusted to be a lower level by one step. For example, the volume may be lowered by 10 decibels (db), which is approximately one half of the initial volume. Of course, other volume reductions are possible and within the purview of the present invention, such as a reduction of 15, 20 or 25 decibels from the normal volume level associated with the PTT mode.

By the present invention, even if the user casually and inadvertently puts the phone close to their ear in the PTT mode to proceed with call communication, the speaker volume can be lowered automatically when the user is listening to the other party's voice. By having the touch switch function added to the PTT button, the PTT phone can determine a call state (i.e., the PTT mode versus the ordinary mobile call mode) of the phone according to a contact state between the user and the phone.

The state of contact of the user with the PTT button is divided into the following three states for controlling the speaker volume: (1) A first state in which the user's finger is not in contact with the PTT button; (2) A second state in which the user's finger is in contact with the PTT button without pressing it; and (3) A third (talk) state in which the user's finger is pressing the PTT button and the voice of the user is transmitted to the other party.

Of the three states, the first and second states are not discriminated between in the phones of the background art having a PTT button. However, in a first embodiment of the present invention having the PTT button with the touch switch function, the first and second states are individually discriminated by sensing contact of a finger of the user with the PTT button. In a second embodiment of the invention, it is determined how the user is holding the PTT phone (e.g. whether the user is facing the phone or whether the user has the phone touching their ear). The present invention discriminates between the first and second states when the phone is in the "PTT mode," and uses the determination to control the volume of the speaker. As for the third state, because there is no speaker output during the transmission (talk) state, description therefor is omitted.

Figure 1:
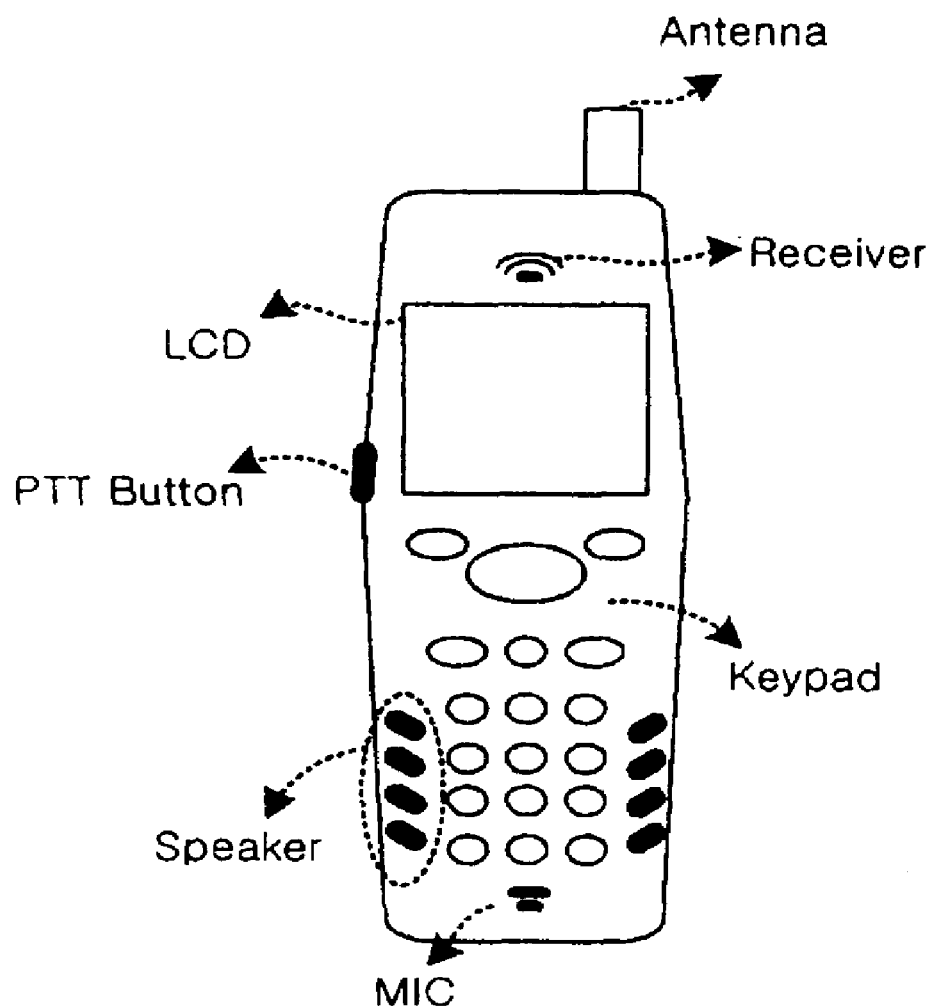
FIG. 1 is a view showing an exterior appearance of a PTT phone, in accordance with the background art.
Figure 2:
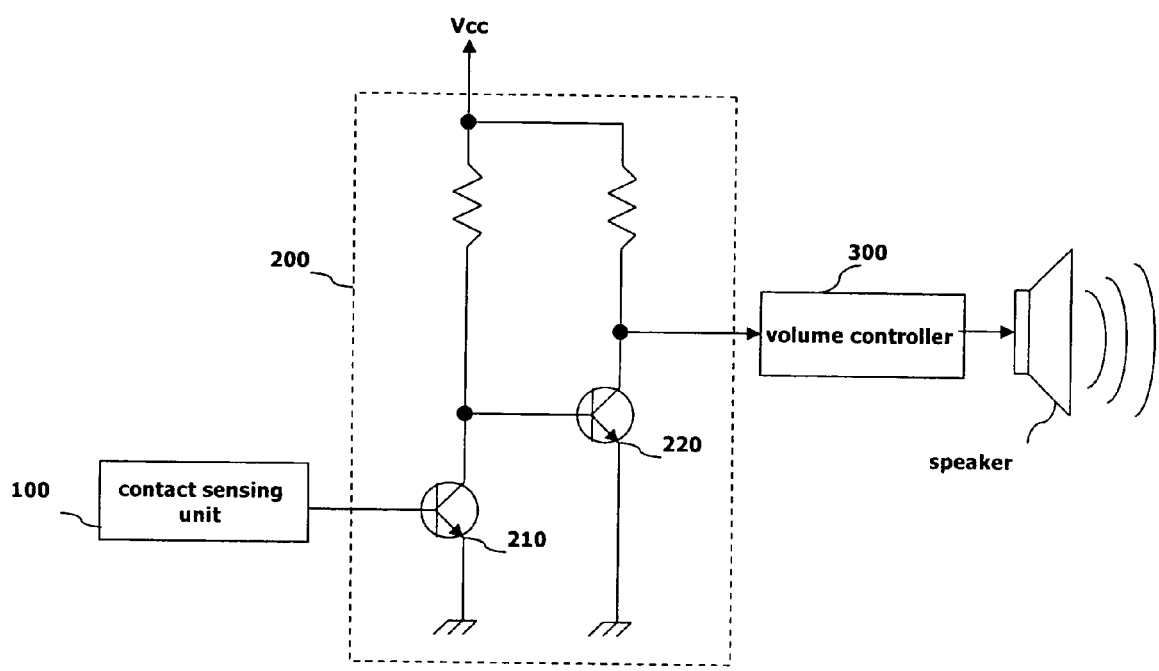
FIG. 2 is a schematic circuit diagram showing an apparatus for controlling a speaker volume of a PTT phone, in accordance with the present invention.
Figure 3:
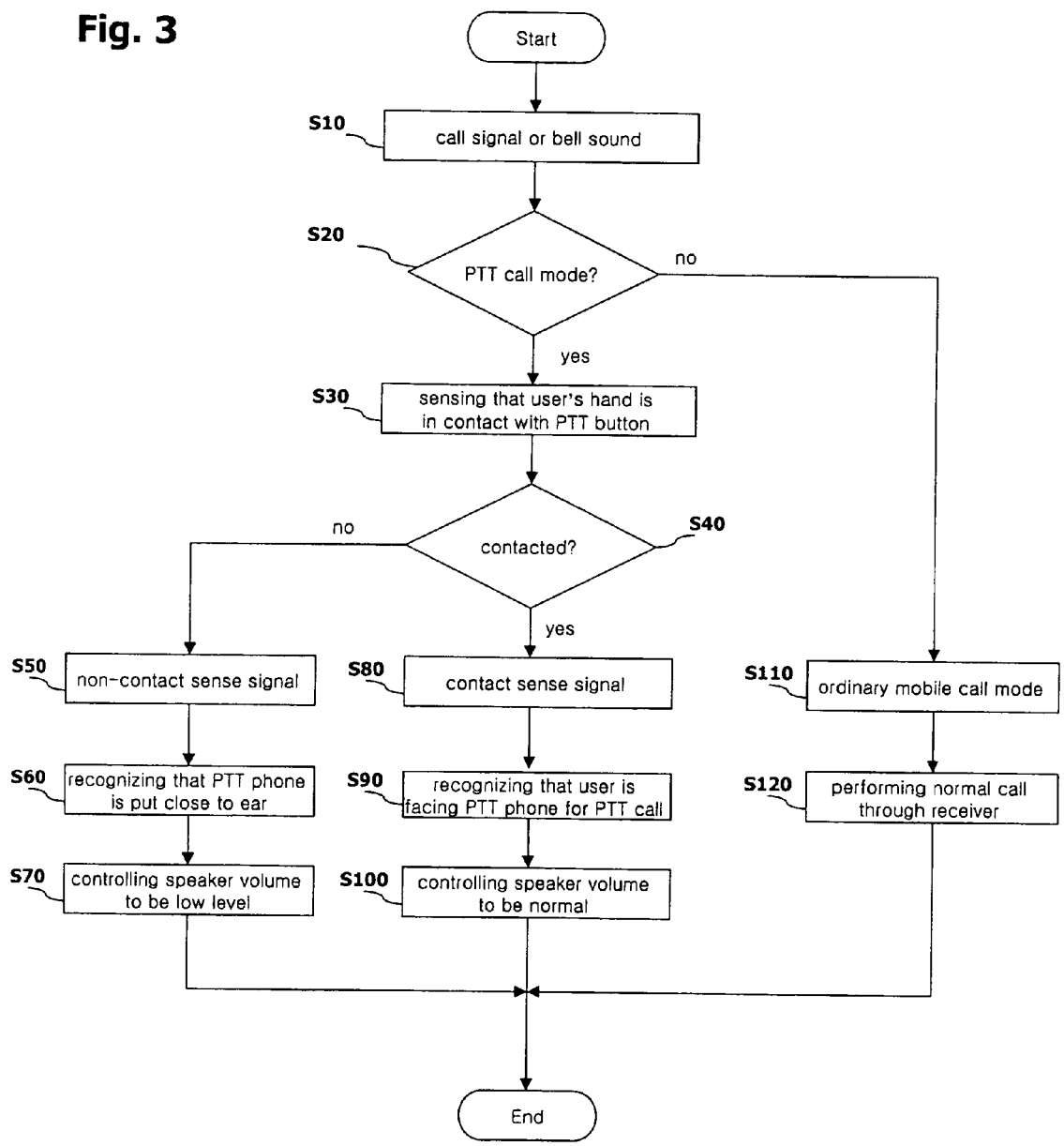
FIG. 3 is a flow chart of a method for controlling the speaker volume of the PTT phone, in accordance with the present invention.

FIG. 2 is a schematic block circuit diagram showing an apparatus for controlling the speaker volume of a phone in accordance with the present invention, and FIG. 3 is a flow chart of a method for controlling the speaker volume of the phone in accordance with a first embodiment of the present invention.

The phone to which the present invention is applied includes a program and hardware for executing the method of the present invention. The hardware of the phone includes a microprocessor (MPU) operating the program and controlling other units, a PTT button for use during a PTT mode, a separated type receiver-loud speaker or integrated type speaker, a key pad having a transmission key for use when making an ordinary mobile call, an LCD as an output unit, and a storage unit for storing the program and other information.

With reference to FIGS. 2 and 3, when the phone receives a call from another party, a bell ringing of the phone is sounded, the user answers the phone (steps S10 and S20). In this case, finger contact of the user with a contact sensing unit 100, formed at the PTT button of the phone, is sensed according to how the user holds the phone (step S30).

When a finger of the user is in contact with the contact sensing unit 100 of the PTT button (step S40), a first transistor 210 of a contact sense signal output unit 200 is turned on by an electrical signal of a small current generated when the contact occurs. The electrical signal is applied to a base terminal of the first transistor 210 from the contact sensing unit 100 causing a second transistor 220 to be turned off. Therefore, the contact sense signal output unit 200 outputs a high level signal, namely, a contact sense signal (step S80).

Upon receiving the high level signal, a volume controller 300 determines that the user is operating the phone in the PTT mode, by holding the PTT phone with a finger being in contact with the PTT button (i.e., a state that the user is facing the phone) (step S90). Accordingly, the volume controller 300 controls the speaker volume to be "normal" at a currently set volume level of the PTT mode (step S100).

However, there is a chance in the "PTT mode" (step S20) that the user mistakes the PTT mode for an ordinary mobile call mode with respect to a call signal from the other party (step S10). In this case, the user puts the phone against their ear to perform an ordinary mobile call communication. When the phone is reoriented to place it against the user's ear, a finger of the user will no longer contact with the contact sensing unit 100 (steps S30 and S40). Therefore, no signal is applied from the contact sensing unit 100 to the base of the first transistor 210, so that the first transistor 210 of the contact sense signal output unit 200 is turned off. Therefore, the second transistor 220 is turned on, and the contact sense signal output unit 200 outputs no signal or only a low level signal, namely, a non-contact sense signal.

Upon receiving the low level signal, the volume controller 300 determines that the user has mistaken the PTT call for an ordinary mobile call, because the user is holding the phone for a mobile mode communication, e.g. naturally holding the lower portion of the phone without having a finger in contact with the PTT button (step S60). Accordingly, the volume controller 300 controls the speaker volume to be lowered one step from the currently set speaker volume (step S70). One step lower could refer to the speaker's volume being lowered, (e.g. 10, 15, 20 or 25 decibels lower) relative to a currently set volume level of the phone in the PTT mode. Such a reduction amount could be a user set menu option or preset by the manufacturer.

In the ordinary mobile call mode (step S110), when the user performs call communication in response to a call signal from another party, a voice signal of the other party is reproduced through the receiver/earpiece, so the volume of the speaker does not need to be adjusted (step S120). However, if the phone has an integrated type receiver-speaker, the speaker volume is, of course, adjusted for the mobile mode communication.

FIG. 4 is a flow chart of a method, in accordance with a fourth embodiment of the present invention, for controlling a speaker volume of a phone having a contact sensing unit formed at a portion of an outer case of the phone where the user's face or ear makes contact during a mobile mode communication.

The embodiment of the method illustrated in FIG. 4 is similar to that of the method illustrated in FIG. 3. Thus, the same reference numerals used in FIG. 3 are given for the same steps in the method of FIG. 4. The method of FIG. 4 uses the same first and second transistors 210 and 220 of the contact sense signal output unit 200 of the phone and the same speaker volume controller 300. However, the method of using the signals is different from the former embodiment of FIG. 3.

In the method of FIG. 4, the contact sensing unit 100 is formed at a specific portion of an outer case of the phone, such as adjacent to, or central to, the receiver/earpiece portion. When the contact sensing unit 100 senses a user's contact (steps S30 and S40), the first transistor 210 of the contact sense signal output unit 200 is turned on by the electrical signal of a small current generated when the contact occurs, while the second transistor 220 is turned off. This arrangement results in the output of a high level signal, namely, the contact sense signal (step S80).

Upon receiving the high level signal, the volume controller 300 determines that the user has mistaken the PTT call (for which the user faces the phone) as an ordinary mobile call (for which the user puts the phone against their ear) (step S220). The volume controller 300 controls the speaker volume to be one step lower than the currently set speaker volume (step S230). Contrary to the case (FIG. 3) where the speaker volume is adjusted to be a lower level when the user's contact with the contact sensing unit 100 of the PTT button is not sensed, in this embodiment (FIG. 4), the speaker volume is adjusted to be a lower level when user's contact with the contact sensing unit 100 is sensed.

In the present invention, the contact sensing unit 100 and the contact sense signal output unit 200 of the phone can be implemented through an optical sensor using a reflection principle of light in order to sense a user's contact. In addition, the contact sensing unit 100 and the contact sense signal output unit 200 also can be implemented by using other types of non-movable switches or sensors or mechanically movable switches or sensors.

As described, the apparatus and method for controlling a speaker volume of a phone, in accordance with the present invention, have several advantages. It is sensed how a user is holding the phone (e.g. whether a finger of the user is in contact with the PTT button, or whether the user's face/ear is in contact with the receiver), and the speaker volume is automatically adjusted according to how the user holds the phone. Thus, an undesirably loud volume level of a loud speaker at an initial stage of PTT call communication (i.e., the first voice sounded from the loud speaker after being transmitted from another party at the point when the user first listens to the voice of the other party in the PTT mode) can be prevented for the users' convenience.

Although the present invention has been described as limiting a volume of a loud speaker when the phone is in a PTT mode, the present invention could also be used in combination with a speaker phone mode of the phone. In other words, the present invention could be used to reduce the volume of a loud speaker, when a phone in the speaker phone mode is inadvertently picked up during a speaker phone call and placed to the ear of the user.

Also, although the present invention has been described as reducing the volume of the loud speaker when a PTT mode communication is confused with a mobile call mode of the phone, it is also possible to emit a warning beep or buzzer to alert the user that the phone is being incorrectly held by the user for the PTT mode. In other words, the user would be alerted that the phone should not be touching their face or ear when in the PTT mode, by the loudspeaker emitting a low to moderate volume beep or alert that the phone is being improperly held.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling a speaker volume of a speaker phone, comprising:
   sensing whether or not there is a user's contact with a specific portion of the speaker phone, by using a contact sensing unit located on the specific portion of the speaker phone which contacts a face or an ear of the user when the user places the speaker phone to their ear; and
   controlling a speaker volume of the speaker phone according to the contact sensing result from the contact sensing unit,
   wherein if the sensing step determines that a user's contact with the contact sensing unit exists, the controlling step automatically adjusts the speaker volume of the speaker phone from an initial volume level to a normal volume level lower than the initial volume level without the user manually adjusting the speaker volume,
   wherein if the sensing step determines that a user's contact with the contact sensing unit does not exist, the controlling step automatically adjusts the speaker volume of the speaker phone back to the initial volume level, and
   wherein the sensing step senses whether or not there is the user's contact with a push-to-talk (PTT) button of the speaker phone by using the contact sensing unit attached to the PTT button.

2. The method of claim 1, wherein the normal volume level is higher than the initial volume level.

3. The method of claim 1, wherein the normal volume level is higher than the initial volume level by approximately 10 decibels.

4. The method of claim 1, further comprising:
   monitoring a state of the speaker phone to determine when the speaker phone is in a push-to-talk (PTT) mode,
   wherein said steps of sensing and controlling are performed when the speaker phone is in the PTT mode.

5. The method of claim 4, wherein the speaker is a loud speaker used during the PTT mode.

6. The method of claim 1, wherein the contact sensing unit generates an electrical signal having a current when skin of the user is in contact with the contact sensing unit.

7. The method of claim 1, wherein the contact sensing unit outputs light and senses light reflected by skin of the user, when the user is in contact with the contact sensing unit.

8. An apparatus for controlling a speaker volume of a speaker phone, comprising:
- a contact sensing unit located on a specific portion of the speaker phone and configured to sense a user's contact with the specific portion of the speaker phone, the specific portion of the speaker phone contacting a face or an ear of the user when the user places the speaker phone to their ear; and
- a volume controller connected to said contact sensing unit for controlling a speaker volume of the speaker phone according to whether or not said contact sensing unit senses the user's contact,
- wherein the contact sensing unit is configured such that if the contact sensing unit determines that the user's contact with the contact sensing unit exists, the contact sensing unit automatically adjusts the speaker volume of the speaker phone from an initial volume level to a normal volume level lower than the initial volume level without the user manually adjusting the speaker volume, and if the contact sensing unit determines that the user's contact with the contact sensing unit does not exist, the volume controller automatically adjusts the speaker volume of the speaker phone back to the initial volume level, and
- wherein the contact sensing unit is attached to a push-to-talk (PTT) button of the speaker phone.

9. The apparatus of claim 8, wherein said contact sensing unit generates an electrical signal having a current when skin of the user is in contact with said contact sensing unit.

10. The apparatus of claim 8, wherein said contact sensing unit outputs light and senses light reflected by skin of the user, when the user is in contact with said contact sensing unit.

11. A speaker phone comprising:
- a case;
- a contact sensing unit disposed on a specific portion of the speaker phone for sensing a user's contact with the specific portion of the speaker phone, the specific portion of the speaker phone contacting a face or an ear of the user when the user places the speaker phone to their ear;
- a speaker housed in said case; and
- a volume controller connecting said contact sensing unit to said speaker, said volume controller controlling a volume of the speaker according to whether or not said contact sensing unit senses the user's contact,
- wherein the contact sensing unit is configured such that if the contact sensing unit determines that the user's contact with the contact sensing unit exists, the contact sensing unit automatically adjusts the speaker volume of the speaker phone from an initial volume level to a normal volume level lower than the initial volume level without the user manually adjusting the speaker volume, and if the contact sensing unit determines that the user's contact with the contact sensing unit does not exist, the volume controller automatically adjusts the speaker volume of the speaker phone back to the initial volume level, and
- wherein the contact sensing unit is attached to a push-to-talk (PTT) button of the speaker phone.

12. The speaker phone of claim 11, wherein said volume controller only changes said speaker volume when said speaker phone is in a push-to-talk (PTT) mode.

13. The apparatus of claim 8, wherein the specific portion of the speaker phone is an earpiece on the speaker phone.

14. The speaker phone of claim 11, wherein the specific portion of the speaker phone is an earpiece on the speaker phone.

* * * * *